July 21, 1942.   J. J. BUCHHEIT   2,290,464
ADJUSTABLE SEAT MOUNTING FOR VEHICLES
Filed May 16, 1940    2 Sheets-Sheet 1

Inventor,
John J. Buchheit,
by Walter P. Guyer
Attorney.

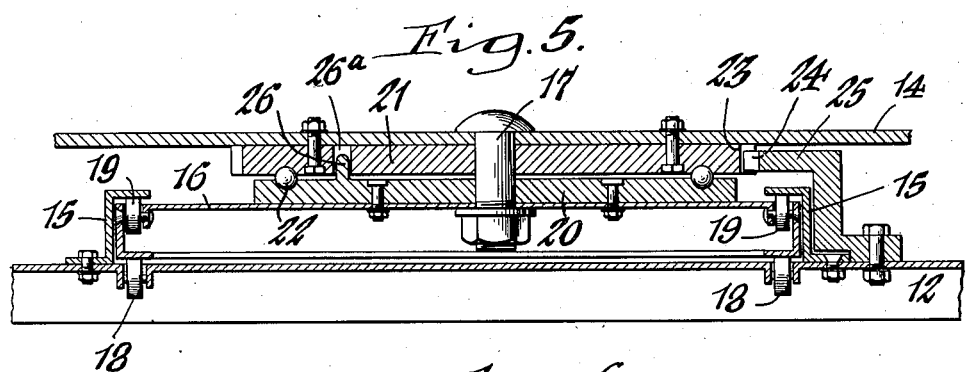
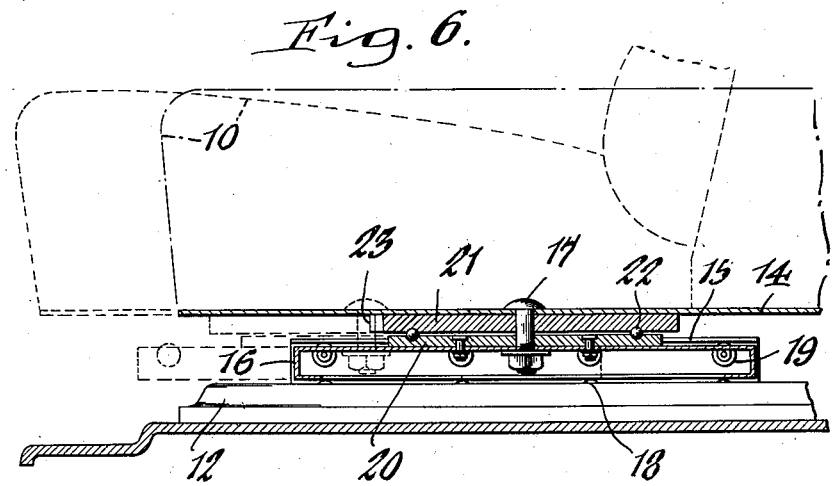
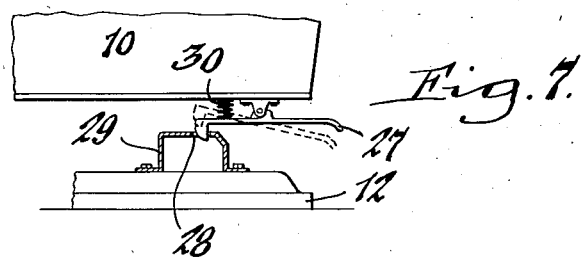

Patented July 21, 1942

2,290,464

UNITED STATES PATENT OFFICE 2,290,464

ADJUSTABLE SEAT MOUNTING FOR VEHICLES

John J. Buchheit, Williamsville, N. Y.

Application May 16, 1940, Serial No. 335,571

4 Claims. (Cl. 155—95)

This invention relates generally to certain new and useful improvements in automobile seats, but more particularly to an adjustable mounting therefor to facilitate the ingress and egress of occupants to and from the car.

One of the objects of the invention is to provide a seat mounting of this character which is so designed and constructed as to enable the seat to both slide and rotate, and thereby present the seat to a position for permitting easy and ready ingress to the seat when entering the car and ready egress from the seat when leaving the car.

A further object is to provide an automobile seat mounting which is simple, compact and inexpensive in construction, which is easy to operate, and which affords a real comfort and convenience, particularly to the car-driver, when entering or leaving the car.

Other features of the invention reside in the construction and arrangement of parts hereinafter described and particularly pointed out in the appended claims.

Figure 1:
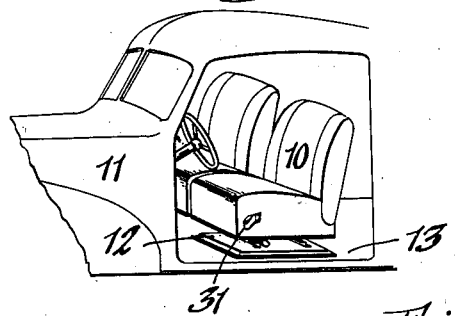
Figure 2:
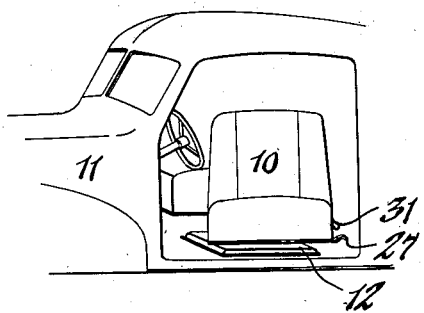
Figure 3:
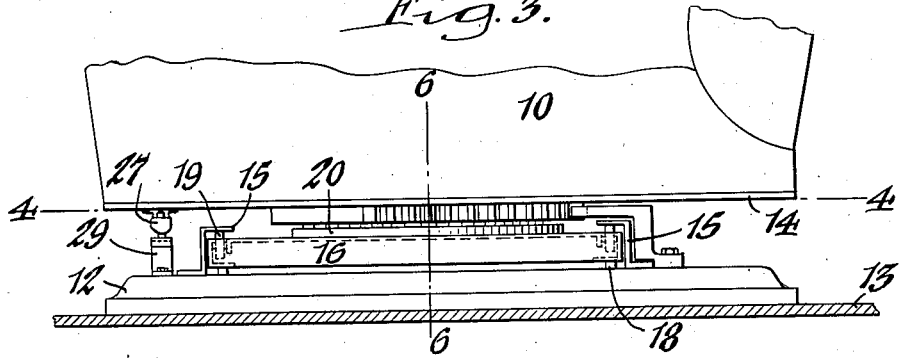
Figure 4:
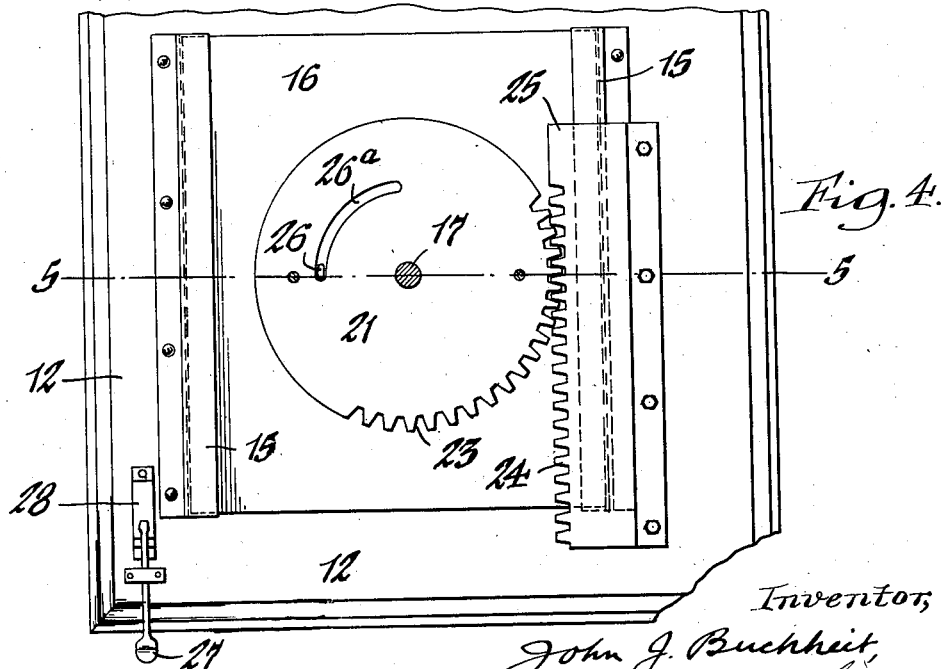

In the accompanying drawings:

Figure 1 is a fragmentary perspective view of an automobile body showing the invention as applied to the driver's seat, the latter being shown in its normal or driving position. Figure 2 is a similar view showing the seat in position for ready ingress or egress of the driver to or from the same. Figure 3 is an enlarged side elevation of the seat mounting. Figure 4 is a horizontal section thereof taken in the plane of line 4—4, Figure 3. Figure 5 is an enlarged cross section of the seat mounting taken substantially in the plane of line 5—5, Figure 4. Figure 6 is a vertical section thereof taken on line 6—6, Figure 3. Figure 7 is a fragmentary front view, partly in section, of the latching device for holding the seat in its normal position.

Similar characters of reference indicate corresponding parts throughout the several views.

While my invention is applicable to the seats of different types of vehicles, such as automobiles, trucks, airplanes and the like, it has been shown, by way of example, in connection with the driver's seat 10 of an automobile-body 11. The improved seat mounting is such as to permit a combined turning or rotating and sliding movement of the seat transversely of the car-body, whereby the seat may be readily shifted and presented to the position shown in Figure 2 to enable the driver to readily occupy or leave the seat in a facile manner. It will be understood that the companion front seat of the car may be similarly mounted and thereby make it easier for the passenger to comfortably enter and leave the car from a sitting position.

Applied to a platform 12 secured to the floor 13 of the car-body and to the underside of the seat-frame 14, respectively, are complementary seat-guiding means which serve to support the seat as well as guide it transversely of the car-body when shifting the same to and from the positions shown in Figures 1 and 2. This guiding means, by preference, consists of a pair of guide tracks or rails 15 suitably secured to the platform 12 in the manner shown in Figures 3 and 4, and a transversely-sliding carriage 16 disposed between the rails and suspended from the seat-frame by a center bolt 17 or the like. To reduce the friction between the complementary guide means and permit the ready sliding of the seat when desired to shift it from one position to the other, roller bearings 18 and 19 are provided between the carriage and the floor and guide tracks, respectively, as shown in Figure 5.

The center bolt 17 which serves to suspend the carriage 16 from the seat-frame 14 also serves as a vertical pivot for permitting a limited turning of the seat relative to the carriage. Interposed between the top side of the carriage and the underside of the seat-frame is a fixed bottom plate 20 which is bolted or otherwise secured to the carriage and surmounting this plate and rotatable about the bolt 17 is a turntable 21 which is bolted to the seat-frame, as shown in Figure 5. Between the opposing faces of the bottom plate 20 and the turntable 21 is a row of ball bearings 22 which facilitates the turning of the seat relative to the carriage. Constituting a part of this turntable is a gear segment 23 which meshes with a gear rack 24 disposed parallel to the guide rails 15 and overhanging one of them in the manner shown in Figures 3, 4 and 5. This gear rack is formed integrally with an angle bar 25 bolted or otherwise secured to the platform alongside one of the guide rails 15. By this construction, a turning movement is simultaneously imparted to the seat by the gearing arrangement 23, 24 to dispose or present the seat in a direction facing the door in one position, as shown in Figure 2, or to dispose the seat in its normal driving position, as shown in Figure 1. The rotational movement of the turntable 21 is limited in either direction by a stop lug 26 rising from the bottom plate 20 and engaging an arcuate slot 26ᵃ in the turntable. This construction also limits the linear movement of the seat crosswise of the vehicle. As the seat is turned toward the doorway, viewing Figure 1, it is simultaneously propelled outwardly and partially projected through the doorway, making the egress or ingress movement of the seat-occupant a very convenient one.

In order to latch the seat in its normal position, I provide a latching lever 27 which is pivoted to the underside of the seat-frame adjacent one side thereof, and which is adapted to normally engage an opening 28 formed in a latch plate or bracket 29 rising from the platform 12. A spring 30 normally retains this lever in its latched position. When it is desired to release the seat for adjusting purposes, the latching lever 27 is depressed to the dotted line position shown in Figure 7. If desired, the outside face of the seat 10 may be provided with a tab 31 whereby the user, from a position exterior of the car, may pull the seat from the position shown in Figure 1 to that shown in Figure 2, where it is accessible for the convenience of the operator. It might be stated here that this seat design is particularly advantageous in that type of vehicle which does not employ the usual running boards.

While manifestly simple, inexpensive and sturdy in construction, this improved seat mounting makes it very easy for the driver or passengers when entering and leaving the car, it affords opportunity for one to properly adjust his clothes upon such occasions, and it renders the vehicle readily accessible for the convenience of cripples and elderly people.

I claim as my invention:

1. A seat mounting for automobiles and the like, comprising guide means adapted for attachment to the floor of the vehicle and transversely in line with its doorway, a sliding carriage for the seat engageable with said guide means for movement toward and from the doorway and having a pivotal connection to the seat to permit a turning of the seat relative to the carriage to and from a position adapted to face and partially project into the doorway, a rack bar disposed in fixed parallel relation to said guide means and along the sliding path of travel of the carriage, and a turntable fixed to the seat to turn therewith about said pivotal connection and having teeth thereon in constant engagement with said rack bar.

2. A seat mounting for automobiles and the like, comprising guide means adapted for attachment to the floor of the vehicle and transversely in line with its doorway, a sliding carriage for the seat engageable with said guide means and having a pivotal connection to the seat to permit a turning of the seat relative to the carriage to and from a position adapted to face and partially project into the doorway, and interengageable means including a part connected to the seat for rotation about said pivotal connection and a part disposed fixedly along the sliding path of travel of the carriage for effecting turning of the seat in one direction or the other simultaneously with the sliding of such carriage in a corresponding direction.

3. The combination of a sliding seat-supporting carriage, a seat pivoted thereon to turn in a plane substantially parallel to the plane of movement of the carriage, a rack bar disposed in fixed parallel relation to the sliding path of travel of said carriage, a turntable applied to the seat in engagement with its pivot and having teeth thereon engaging said rack bar, said turntable having an arcuate slot therein, and a lug applied to the carriage and engaging said slot for limiting the sliding movements of the carriage and the turning movement of the seat.

4. A seat mounting for automobiles and the like, comprising guide means adapted for attachment to the floor of the vehicle and transversely in line with its doorway, a sliding carriage for the seat engageable with said guide means and having a pivotal connection to the seat to permit a turning of the seat relative to the carriage to and from a position adapted to face and partially project into the doorway, interengageable means including a part connected to the seat for rotation about said pivotal connection and a part disposed fixedly along the sliding path of travel of the carriage for effecting turning of the seat in one direction or the other simultaneously with the sliding of such carriage in a corresponding direction, and means interposed between said carriage and the rotating part of said interengageable means for limiting the sliding movements of the carriage and the turning movements of the seat.

JOHN J. BUCHHEIT.